(12) United States Patent
Webb et al.

(10) Patent No.: US 7,448,294 B2
(45) Date of Patent: Nov. 11, 2008

(54) ROBOTIC DEVICES

(75) Inventors: Michael James Morley Webb, Fleet (GB); Jayan Ragavan, Maidenhead (GB)

(73) Assignee: Quin Systems Limited, Wokingham, Berkshire (GB)

( * ) Notice: Subject to any disclaimer, the term of this patent is extended or adjusted under 35 U.S.C. 154(b) by 410 days.

(21) Appl. No.: 10/480,137

(22) PCT Filed: Jun. 10, 2002

(86) PCT No.: PCT/GB02/02434

§ 371 (c)(1),
(2), (4) Date: Dec. 8, 2003

(87) PCT Pub. No.: WO02/100605

PCT Pub. Date: Dec. 19, 2002

(65) Prior Publication Data
US 2004/0158356 A1   Aug. 12, 2004

(30) Foreign Application Priority Data
Jun. 8, 2001   (GB) .................... 0113985.6

(51) Int. Cl.
*B25J 9/02* (2006.01)
(52) U.S. Cl. ........................... 74/490.01; 901/2
(58) Field of Classification Search ............. 74/490.07, 74/490.09, 490.01, 490.05; 414/735
See application file for complete search history.

(56) References Cited

U.S. PATENT DOCUMENTS

| 3,093,008 | A | * | 6/1963 | Wight | .................. 74/335 |
|---|---|---|---|---|---|
| 3,262,593 | A | * | 7/1966 | Hainer | .................. 414/619 |
| 4,260,319 | A | * | 4/1981 | Motoda et al. | .............. 414/591 |
| 4,652,204 | A | * | 3/1987 | Arnett | .................... 414/751.1 |
| 4,821,207 | A | * | 4/1989 | Ming et al. | ................. 700/252 |
| 4,912,650 | A | * | 3/1990 | Tanaka et al. | ............... 700/264 |
| 5,148,091 | A | * | 9/1992 | Lagercrantz | .......... 318/568.11 |
| 5,227,978 | A | * | 7/1993 | Kato | .......................... 700/189 |

(Continued)

FOREIGN PATENT DOCUMENTS

JP        61257829 A   * 11/1986

(Continued)

OTHER PUBLICATIONS

Shaolin Cui, Time-Optimal Trajectory Planning for Sequential Robotic Tasks with Unfixed Endpoints, The University of Western Ontario, pp. iii-iv-51-52,56,-57.*

*Primary Examiner*—Terence Boes
(74) *Attorney, Agent, or Firm*—Barnes & Thornburg LLP

(57) ABSTRACT

By moving supports A and C along respective tracks (3) and (4), the free end B of robot arm (2), with gripper (5), is caused to move along a path P, the locus of which may be varied by varying the movements of the supports A and C. Motors (6) and (7) are not carried on the robot arm (2), but are secured to the frame (10) of the device (1). The robot arm (2) may thus have very low mass, resulting in very high performance in terms of speed and efficiency. The path P may comprise a NURB curve, and the time-distance function of motion of end B of arm (2) along path P may comprise a polynomial function having first and second derivative (velocity and acceleration) continuous curves.

26 Claims, 1 Drawing Sheet

U.S. PATENT DOCUMENTS

| | | | |
|---|---|---|---|
| 5,458,265 A * | 10/1995 | Hester et al. | 223/72 |
| 5,603,243 A * | 2/1997 | Finley | 74/490.07 |
| 5,632,588 A * | 5/1997 | Crorey et al. | 198/468.2 |
| 5,704,253 A * | 1/1998 | Book et al. | 74/490.01 |
| 5,841,959 A * | 11/1998 | Guiremand | 345/440 |
| 5,923,139 A * | 7/1999 | Colgate et al. | 318/566 |
| 5,973,678 A * | 10/1999 | Stewart et al. | 345/184 |
| 6,002,231 A * | 12/1999 | Dirkx et al. | 318/609 |
| 6,114,825 A * | 9/2000 | Katz | 318/615 |
| 6,131,097 A * | 10/2000 | Peurach et al. | 707/102 |
| 6,151,981 A * | 11/2000 | Costa | 74/490.03 |
| 6,264,419 B1 * | 7/2001 | Schinzel | 414/751.1 |
| 6,356,829 B1 * | 3/2002 | Fan et al. | 701/50 |
| 6,552,507 B2 * | 4/2003 | Miyazawa | 318/568.11 |

FOREIGN PATENT DOCUMENTS

| | | | |
|---|---|---|---|
| JP | 5-346149 | * | 12/1993 |
| JP | 07009371 A | * | 1/1995 |

* cited by examiner

ROBOTIC DEVICES

This invention relates to robotic devices.

Preferred embodiments of the invention aim to provide robotic devices which are simple and cheap to make, but may nevertheless operate at high speed and efficiency.

According to one aspect of the present invention, there is provided a robotic device comprising:
- a. a first track extending between first and second end points;
- b. a second track, non-parallel to the first track, extending between third and fourth end points;
- c. a first support mounted for movement along said first track between said first and second end points;
- d. a second support mounted for movement along said second track between said third and fourth end points;
- e. drive means for driving said first and second supports along their respective tracks between their respective end points such that movement of each of said supports may be independent of the movement of the other; and
- f. a robot arm pivotally mounted on said first support at a first location on said arm, such that said arm may pivot with respect to said first support, and pivotally mounted on said second support at a second location on said arm, spaced from said first location, such that said arm may pivot with respect to said second support, and such that said arm can slide with respect to one of said first and second supports, whereby movement of said supports along said tracks causes movement of said robot arm.

Preferably, said tracks lie in a common plane, and said arm is arranged to move in said common plane or a plane parallel to said common plane.

Preferably, at least one of said tracks is rectilinear.

Preferably, both of said tracks are rectilinear.

Preferably, said tracks are mutually orthogonal.

Preferably, said drive means comprises a first drive means for driving said first support and a second drive means, separate from the first drive means, for driving said second support.

Preferably, each said drive means comprises a prime mover mounted on a frame of the device and connected to each respective support by a drive transmission means.

Preferably, the robot arm is rectilinear.

Preferably, said first location is at a first end of the robot arm and said second location is intermediate the ends of the robot arm.

Preferably, said arm can slide with respect to only the second of said first and second supports.

Preferably, a robotic device as above further comprises gripping means at a third location on said robot arm.

Preferably, said third location is at a free end of the robot arm.

Preferably, a robotic device as above further comprises control means for controlling said drive means.

Preferably, said control means is programmable, to control said drive means to cause said robot arm to follow a predetermined path.

Said control means may be programmed to control said drive means to cause said robot arm to follow a predetermined path composed of a series of straight lines.

Said control means may be programmed to control said drive means to cause said robot arm to follow a predetermined path composed of a series of straight lines and circular arcs.

Preferably, said control means is programmed to control said drive means to cause said robot arm to follow a predetermined path comprising a curve defined by a function of spatial co-ordinates that is continuous in both its first and second derivatives.

Preferably, said function is continuous in its third derivative.

Preferably, said curve comprises a NURB (non-uniform rational B-spline) curve.

Preferably, said control means is arranged to control said drive means such that the time-distance function of motion along said path comprises a polynomial function having a first derivative (velocity) continuous curve.

Preferably, said control means is arranged to control said drive means such that the time-distance function of motion along said path comprises a polynomial function having a second derivative (acceleration) continuous curve.

Preferably, said control means is arranged to control said drive means such that the time-distance function of motion along said path comprises a polynomial function having a third derivative (jerk) continuous curve.

In another aspect, the invention provides a method of operating a robotic device according to any of the preceding aspects of the invention, the method comprising the steps of:
calculating a path along which the robot arm is to travel; and
constraining the robot arm to travel along said path.

Preferably, such a method includes the steps of displaying a curve on a screen, and modifying the shape of the curve to define said path.

Preferably, said modifying step is effected by moving with a "click-and-drag" mouse movement control points that are spaced from said curve and the positions of which affect the shape of said curve.

Preferably, such a method includes the step of also displaying on the screen a plan of an area or volume in which said path is to be located, and upon which plan said path is superimposed.

BRIEF DESCRIPTION OF THE DRAWINGS

For a better understanding of the invention, and to show how embodiments of the same may be carried into effect, reference will now be made, by way of example, to the accompanying diagrammatic drawing, in which.

DETAILED DESCRIPTION OF THE INVENTION

Figure 1:
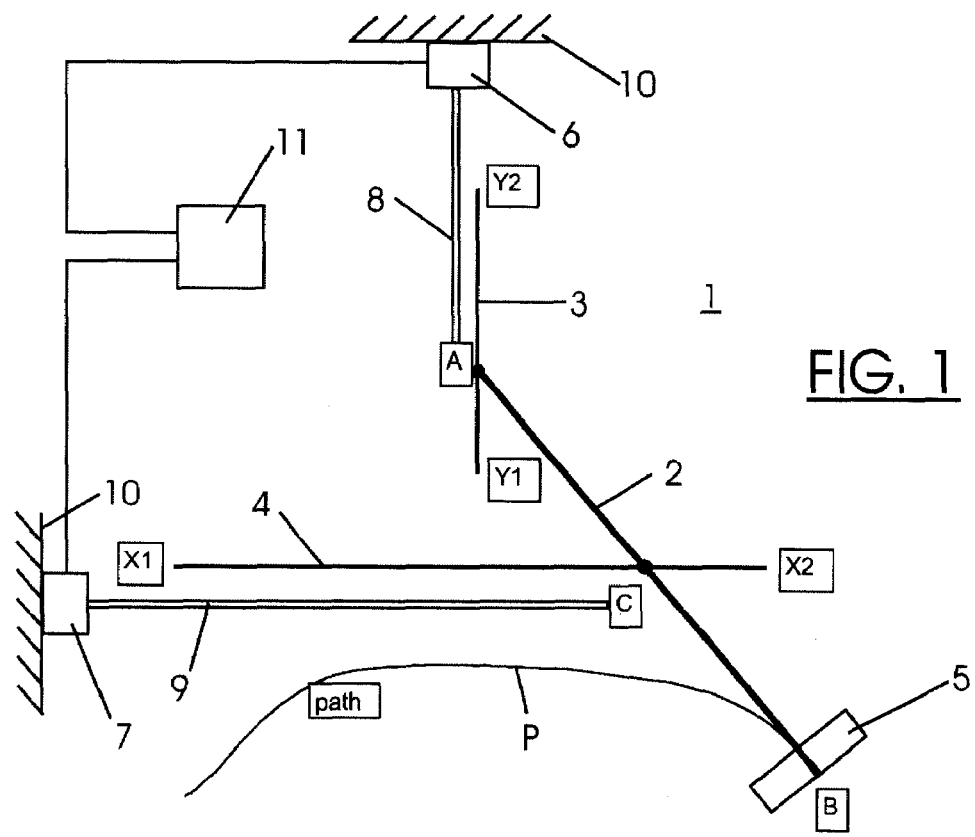
FIG. 1 illustrates one example of a robotic device embodying the present invention.

The robotic device 1 illustrated in FIG. 1 comprises a robot arm 2 which is pivotally mounted on first and second supports A and C, which in turn are mounted for sliding movement along first and second tracks 3 and 4 respectively.

The first track 3 is rectilinear and extends between end points Y1 and Y2. The second track 4 is also rectilinear and extends orthogonally to the first track 3, in the same plane, between respective end points X1 and X2. The robot arm 2 is pivotally mounted on the first support A at a first end of the arm 2, and pivotally mounted on the second support C at a point between the ends of the arm 2. The mounting of the arm 2 on the second support C also affords mutual sliding between the arm 2 and the support C. At its free end B, the robot arm 2 carries a gripper 5, arranged to hold and release parts to be carried by the robotic device 1.

Each of the supports A and C is mounted for sliding movement along its respective track 3 and 4, and is driven by a respective motor 6 and 7, from which drive is transmitted by means of a respective toothed belt 8 and 9. The motors 6 and 7 are mounted on a frame 10 of the robotic device 1. A programmable controller 11 controls operation of the motors 6 and 7.

It will be appreciated that, by moving the supports A and C along their respective tracks 3 and 4, the free end B of the robot arm 2, with the gripper 5, is caused to move along a path P, the locus of which may be varied by varying the movements of the supports A and C. In many robotic applications, it is desired simply to pick up an item from one predetermined location and transfer it to another predetermined location. The illustrated robotic device 1 is particularly suitable for such simple "pick and place" operations, especially when carried out as a two-dimensional operation, where the two tracks 3 and 4 lie substantially in the same plane, together with the robot arm 2 (which may, from a practical point of view, be in a relatively closely spaced, parallel plane).

The controller 11 may be programmed very simply by way of Cartesian coordinates to cause the supports A and C to be moved sequentially along y and x axes respectively, such that the free end B of the robot arm 2 moves in a series of substantially straight lines. If one of the supports A and C is accelerated from rest as the other of the supports is being decelerated to rest, then the straight line portions of the path P may be joined by curves, for smooth and efficient operation. The path P may, in general, comprise any shaped curve or series of curves (a curve here including a straight line.)

A significant feature of the illustrated robotic device 1 is that, in contrast to many known robotic devices, the motors 6 and 7 are not carried on the robot arm 2, but are secured to the frame 10 of the device 1. This means that the robot arm 2 may have very low mass, resulting in very high performance in terms of speed and efficiency. For example, in situations where previous robotic devices have been able to operate at a maximum speed of around 25 cycles per minute, we have found that a robotic device such as that illustrated may operate at up to 100 cycles per minutes, representing greatly increased speed and efficiency.

It will be appreciated that a robotic device as illustrated may be constructed simply and economically.

Tracks such as 3 and 4 may alternatively be disposed at a different angle to one another, and need not be rectilinear. For example, one could be rectilinear and the other curved. The tracks and robot arm need not be in the same plane. However, such alternative configurations may entail less simple programming of a controller such as 11.

The motors 6 and 7 as illustrated may typically be rotary drive motors. Alternatively, linear motors or any other prime movers with suitable drive transmissions may be employed. A single prime mover may drive both supports A and C by way of suitable drive transmissions.

In a preferred arrangement, the X,Y (or r,theta) path of motion P comprises a curve that is continuous in both its first and second derivatives. If required, third (or higher) order derivative continuity can also be specified.

The path can be made up of more than one section or segment and can be referred to as 'piecewise continuous' along its length. The order of derivative to meet a continuous curve may be specified between each section or segment.

Also, motion (time-distance) is preferably specified along the path P as a first and/or second derivative (velocity and acceleration) continuous curve. If required, third derivative (jerk) (or higher) continuity can also be specified. Start, end and maximum values of all derivatives can also be specified. By specifying the motion along the path P as a polynomial function with the above attributes, one can ensure that the motion is very smooth and has zero acceleration as well as zero velocity at both ends of the movement.

A particularly advantageous way of designing the desired path P is by way of a NURB (non-uniform rational B-spline) curve. A NURB curve has the desirable properties of continuity in both its first and second derivatives, and can easily be manipulated without involving a deep knowledge or use of mathematics. It may provide an efficient and flexible technique that ensures the desired order of derivative to meet a continuous curve while allowing the curve to be shaped geometrically.

Splines have been used for many years—shipbuilders, for example, would use a long flexible strip of material (e.g. wood)—a spline—that could be pulled into a desired shape by the application of weights at chosen points. Due to the flexible properties of the material, smooth curves would naturally result.

An analogous method of control or operation may be provided graphically by displaying a line, or spline, on a computer screen, and pulling it into a desired shape by means of control points that affect the curvature of the line, the behaviour of the line being defined by a NURB algorithm. For example, in FIG. 2, the path P shown on a screen 50 of computer 52 has end points 21 and 25, and three intermediate points 22, 23 and 24 through which the path P must pass. Control points 31 to 36 act on the line 15 of the path P to pull it into the desired shape. Since the line 15 is defined (programmed) to have the properties of a NURB, it responds to movements of the control points 31 to 36 to behave accordingly with, for example, continuity in both its first and second derivatives, as mentioned above.

The control points 31 to 36 may conveniently be moved on-screen by a "click-and-drag" movement of mouse 51, until the path P passes through all of the desired points 21 to 25. The control points 31 to 36 may be moved in alternative ways. An operator may have the facility to add and subtract control points as desired, and/or the option to modify the "weighting" of individual control points or all of the control points—that is, the degree of effect that movement of one or more control point will have on the shape of the line 15. Computer 52 provides display means for displaying a curve on screen 50 and modifying means for modifying the shape of the curve, mouse 51 providing input means to computer 52.

Figure 2:
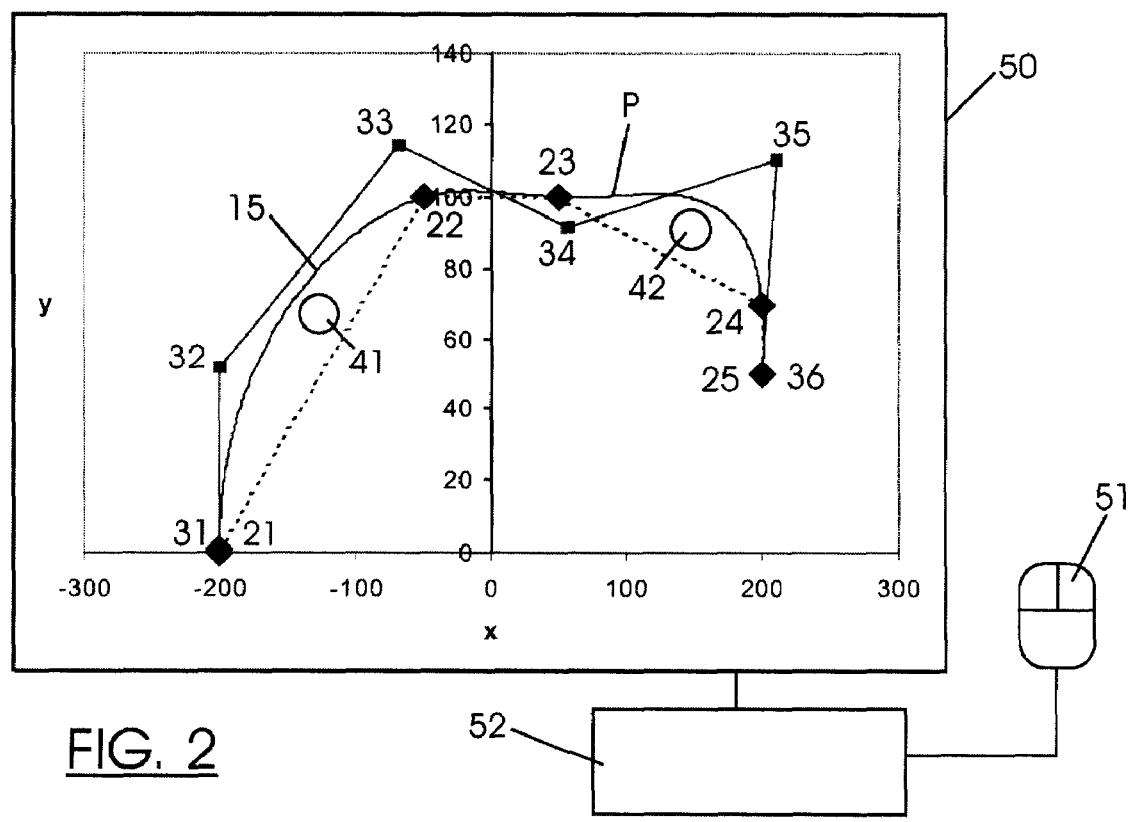
FIG. 2 illustrates a method of control for a robotic device.

FIG. 2 also shows two obstacles 41 and 42 that the path P has to avoid. The control points 31 to 36 are adjusted to ensure that the obstacles are indeed avoided.

Thus, an operator can readily design a new path P, with little or no computer programming requirement. A floor plan (or vertical plan), say, is displayed on the computer screen 50 by a CAD (Computer Aided Design) program, and the line 15 with control points 31 to 36 (or as desired) is superimposed on the floor plan. The control points 31 to 36 are then manipulated to shape the line 15 to adopt a desired shape of curve, between defined end points, passing through defined intermediate points, and/or avoiding defined obstacles.

As an alternative to manipulating the control points 31 to 36, an operator can specify the end and intermediate points 21 to 25, together with any obstacles such as 41 and 42, and the NURB curve shape of the line 15 may be interpolated from those given points, using a NURB algorithm.

Although above examples of embodiments of the invention are given in two dimensions, it may be appreciated that the principles may readily be adapted to three dimensions. For example, the FIG. 1 embodiment may be adapted by adding tracks orthogonal to those shown.

Although the curve shape of the line 15 may be conveniently described in NURB form, which provides a very compact mathematical way of describing the curve shape, it may alternatively be described using other polynomial forms.

The operator can also define points of zero velocity and dwell time at any end or intermediate points, from which a polynomial function of motion may be derived with minimum transit time (maximum average velocity), but with the desirable attributes of continuous curves in its first and second (and optionally third) derivates.

The advantage of using such a technique is that the motion can be both very smooth and very fast between two points (start and end). It is also self-optimising in between the end points, using NURB control points simply to guide the path over any obstacle that lies between.

Thus, a user may specify the shape of the path P in two or three dimensions using either geometric 'control points' that allow the user to interactively visually shape the curve while maintaining the continuity described above, or for the curve to interpolate a set of user defined 2D or 3D points.

Using a graphical display, it is easy for the operator to define a motion that avoids obstacles. The motion may be both fast and smooth without the operator having to specify how this is done.

In this specification, the verb "comprise" has its normal dictionary meaning, to denote non-exclusive inclusion. That is, use of the word "comprise" (or any of its derivatives) to include one feature or more, does not exclude the possibility of also including further features.

The invention claimed is:

1. A robotic device comprising:
   a. a first track extending between first and second end points;
   b. a second track, non-parallel to the first track, extending between third and fourth end points;
   c. a first support mounted for movement along said first track between said first and second end points;
   d. a second support mounted for movement along said second track between said third and fourth end points;
   e. drive means for driving said first and second supports along their respective tracks between their respective end points such that each of said supports moves independently of the movement of the other; and
   f. a robot arm mounted on said first support at a first location on said arm, and mounted on said second support at a second location on said arm, spaced from said first location;
   g. wherein, said robot arm is mounted on said first support by a first pivot point, such that said arm pivots with respect to said first support; and
   h. wherein, said robot arm is mounted on said second support by a second pivot point and a linear slider, such that said arm both pivots with respect to said second support and slides linearly with respect to said second support, longitudinally on said arm.

2. A robotic device according to claim 1, wherein said tracks lie in a common plane, and said arm is arranged to move in said common plane or a plane parallel to said common plane.

3. A robotic device according to claim 1, wherein at least one of said tracks is rectilinear.

4. A robotic device according to claim 3, wherein both of said tracks are rectilinear.

5. A robotic device according to claim 4, wherein said tracks are mutually orthogonal.

6. A robotic device according to claim 1, wherein said drive means comprises a first drive means for driving said first support and a second drive means, separate from the first drive means, for driving said second support.

7. A robotic device according to claim 1, wherein each said drive means comprises a prime mover mounted on a frame of the device and connected to each respective support by a drive transmission means.

8. A robotic device according to claim 1, wherein the robot arm is rectilinear.

9. A robotic device according to claim 1, wherein said first location is at a first end of the robot arm and said second location is intermediate the ends of the robot arm.

10. A robotic device according to claim 9, wherein said arm can slide with respect to only the second of said first and second supports.

11. A robotic device according to claim 1, further comprising gripping means at a third location on said robot arm.

12. A robotic device according to claim 11, wherein said third location is at a free end of the robot arm.

13. A robotic device according to claim 1, further comprising control means for controlling said drive means.

14. A robotic device according to claim 13, wherein said control means is programmable, to control said drive means to cause said robot arm to follow a predetermined path.

15. A robotic device according to claim 14, wherein said control means is programmed to control said drive means to cause said robot arm to follow a predetermined path composed of a series of straight lines.

16. A robotic device according to claim 14, wherein said control means is programmed to control said drive means to cause said robot arm to follow a predetermined path composed of a series of straight lines and circular arcs.

17. A robotic device according to claim 14, wherein said control means is programmed to control said drive means to cause said robot arm to follow a predetermined path comprising a curve defined by a function of spatial co-ordinates that is continuous in both its first and second derivatives.

18. A robotic device according to claim 17, wherein said function is continuous in its third derivative.

19. A robotic device according to claim 17, wherein said curve comprises a non-uniform rational B-spline (NURB) curve.

20. A robotic device according to claim 14, wherein said control means is arranged to control said drive means such that the time-distance function of motion along said path comprises a polynomial function having a first derivative continuous velocity curve.

21. A robotic device according to claim 14, wherein said control means is arranged to control said drive means such that the time-distance function of motion along said path comprises a polynomial function having a second derivative continuous acceleration curve.

22. A robotic device according to claim 14, wherein said control means is arranged to control said drive means such that the time-distance function of motion along said path comprises a polynomial function having a third derivative continuous jerk curve.

23. A robotic device according to claim 14, further comprising display means for displaying a curve on a screen and modifying means for modifying the shape of the curve to define said path.

24. A robotic device according to claim 23, further comprising plan display means for displaying on the screen a plan of an area or volume in which said path is to be located, and upon which plan said path is superimposed.

25. A robotic device according to claim 23, wherein said modifying means comprises input means for moving with a click-and-drag mouse movement control points that are spaced from said curve and the positions of which affect the shape of said curve.

26. A robotic device according to claim 14, wherein said control means comprises input means for inputting co-ordinates of predetermined points on said path and interpolating means for interpolating said curve from said points.

* * * * *